(12) United States Patent
Davis

(10) Patent No.: US 8,777,229 B2
(45) Date of Patent: Jul. 15, 2014

(54) LIFTOFF CARBON SEAL

(75) Inventor: Todd A. Davis, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 728 days.

(21) Appl. No.: 12/732,336

(22) Filed: Mar. 26, 2010

(65) Prior Publication Data

US 2011/0233871 A1    Sep. 29, 2011

(51) Int. Cl.
*F16J 15/38*    (2006.01)

(52) U.S. Cl.
USPC ........... 277/390; 277/391; 277/392; 277/393; 277/397

(58) Field of Classification Search
USPC .......... 277/409, 367, 370, 371, 390–393, 397
See application file for complete search history.

(56) References Cited

U.S. PATENT DOCUMENTS

| | | | | |
|---|---|---|---|---|
| 3,227,463 A | * | 1/1966 | Wiese | 277/408 |
| 3,628,799 A | * | 12/1971 | Wiese | 277/401 |
| 3,638,957 A | * | 2/1972 | Marsi | 277/400 |
| 4,272,084 A | * | 6/1981 | Martinson et al. | 277/365 |
| 4,477,088 A | * | 10/1984 | Picard | 277/379 |
| 4,586,719 A | * | 5/1986 | Marsi et al. | 277/385 |
| 4,588,500 A | | 5/1986 | Sprenger et al. | |
| 4,648,729 A | | 3/1987 | Jones | |
| 4,722,534 A | | 2/1988 | Wentworth | |
| 4,844,487 A | | 7/1989 | Eakin | |
| 4,887,395 A | * | 12/1989 | Lebeck et al. | 451/239 |
| 4,892,667 A | | 1/1990 | Parker, III et al. | |
| 4,928,978 A | | 5/1990 | Shaffer et al. | |
| 5,014,999 A | * | 5/1991 | Makhobey | 277/422 |
| 5,058,904 A | | 10/1991 | Nevola | |
| 5,066,026 A | | 11/1991 | Heck et al. | |
| 5,090,712 A | * | 2/1992 | Pecht et al. | 277/400 |
| 5,145,189 A | | 9/1992 | Pope | |
| 5,201,531 A | * | 4/1993 | Lai | 277/400 |
| 5,237,811 A | | 8/1993 | Stockwell | |
| 5,324,048 A | * | 6/1994 | Carmody | 277/367 |
| 5,415,478 A | | 5/1995 | Matthews et al. | |
| 5,433,584 A | | 7/1995 | Amin et al. | |
| 5,443,274 A | * | 8/1995 | Fuse | 277/390 |
| 5,464,227 A | | 11/1995 | Olson | |
| 5,498,007 A | * | 3/1996 | Kulkarni et al. | 277/400 |
| 5,603,602 A | | 2/1997 | Romani | |
| 5,702,110 A | * | 12/1997 | Sedy | 277/400 |

(Continued)

FOREIGN PATENT DOCUMENTS

| | | |
|---|---|---|
| EP | 0177161 | 4/1986 |
| GB | 2325031 | 11/1998 |
| NL | 7609950 | 3/1977 |

OTHER PUBLICATIONS

European Search Report for European Patent Application No. 11159745.6 completed Feb. 4, 2013.

*Primary Examiner* — Vishal Patel
*Assistant Examiner* — Eugene G Byrd
(74) *Attorney, Agent, or Firm* — Carlson, Gaskey & Olds, PC

(57) ABSTRACT

A liftoff carbon seal assembly includes a rotating seal plate adjacent to a rotating seal backer plate and a rotating seal plate retainer. The rotating seal plate defines a rotating seal plate face which extends beyond a rotating seal plate retainer face of the rotating seal plate retainer with a static carbon seal is adjacent to the rotating seal plate.

25 Claims, 3 Drawing Sheets

(56) References Cited

U.S. PATENT DOCUMENTS

| | | | |
|---|---|---|---|
| 5,901,965 A * | 5/1999 | Ringer et al. | 277/369 |
| 5,947,481 A * | 9/1999 | Young | 277/400 |
| 6,145,843 A | 11/2000 | Hwang | |
| 6,175,813 B1 | 1/2001 | Purchase et al. | |
| 6,311,983 B1 * | 11/2001 | Burcham | 277/370 |
| 6,318,958 B1 | 11/2001 | Giesler et al. | |
| 6,364,605 B1 * | 4/2002 | Lutes | 415/111 |
| 6,422,396 B1 | 7/2002 | Li et al. | |
| 6,428,009 B2 | 8/2002 | Justak | |
| 6,446,976 B1 * | 9/2002 | Key et al. | 277/367 |
| 6,623,238 B2 | 9/2003 | Langston et al. | |
| 6,789,804 B2 | 9/2004 | Wilhelm | |
| 6,848,689 B2 * | 2/2005 | Auber | 277/377 |
| 6,877,950 B2 | 4/2005 | Liu | |
| 7,175,388 B2 * | 2/2007 | Labbe et al. | 415/174.5 |
| 7,182,345 B2 | 2/2007 | Justak | |
| 7,229,247 B2 | 6/2007 | Durocher et al. | |
| 7,229,249 B2 | 6/2007 | Durocher et al. | |
| 7,331,761 B2 | 2/2008 | Hansen et al. | |
| 7,409,819 B2 | 8/2008 | Henry | |
| 7,540,501 B2 | 6/2009 | Flaherty | |
| 7,819,405 B2 * | 10/2010 | Ohama et al. | 277/370 |
| 2006/0103074 A1 * | 5/2006 | Droscher et al. | 277/370 |
| 2010/0164180 A1 * | 7/2010 | Short | |

* cited by examiner

LIFTOFF CARBON SEAL

BACKGROUND

The present disclosure relates to a seal assembly, and more particularly to a liftoff seal.

Liftoff seals are frequently used on main shafts of aircraft gas turbine engines or on other industrial gas turbines. Such engines utilize liftoff seals which spin at a high rate. The carbon seal is of significant importance to performance and are supported to minimize distortion due to thermal and pressure effects.

SUMMARY

A liftoff carbon seal assembly according to an exemplary aspect of the present disclosure includes a rotating seal plate adjacent to a rotating seal backer plate and a rotating seal plate retainer, the rotating seal plate defines a rotating seal plate face which extends beyond a rotating seal plate retainer face of the rotating seal plate retainer. A static carbon seal is adjacent to the rotating seal plate.

A liftoff carbon seal assembly according to an exemplary aspect of the present disclosure includes a rotating seal plate adjacent to a rotating seal backer plate and a rotating seal plate retainer, the rotating seal plate retainer defines a lip. A rotating seal plate adjacent to the rotating seal backer plate and the rotating seal plate retainer, the rotating seal plate defines a rotating seal plate face which extends beyond the lip.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
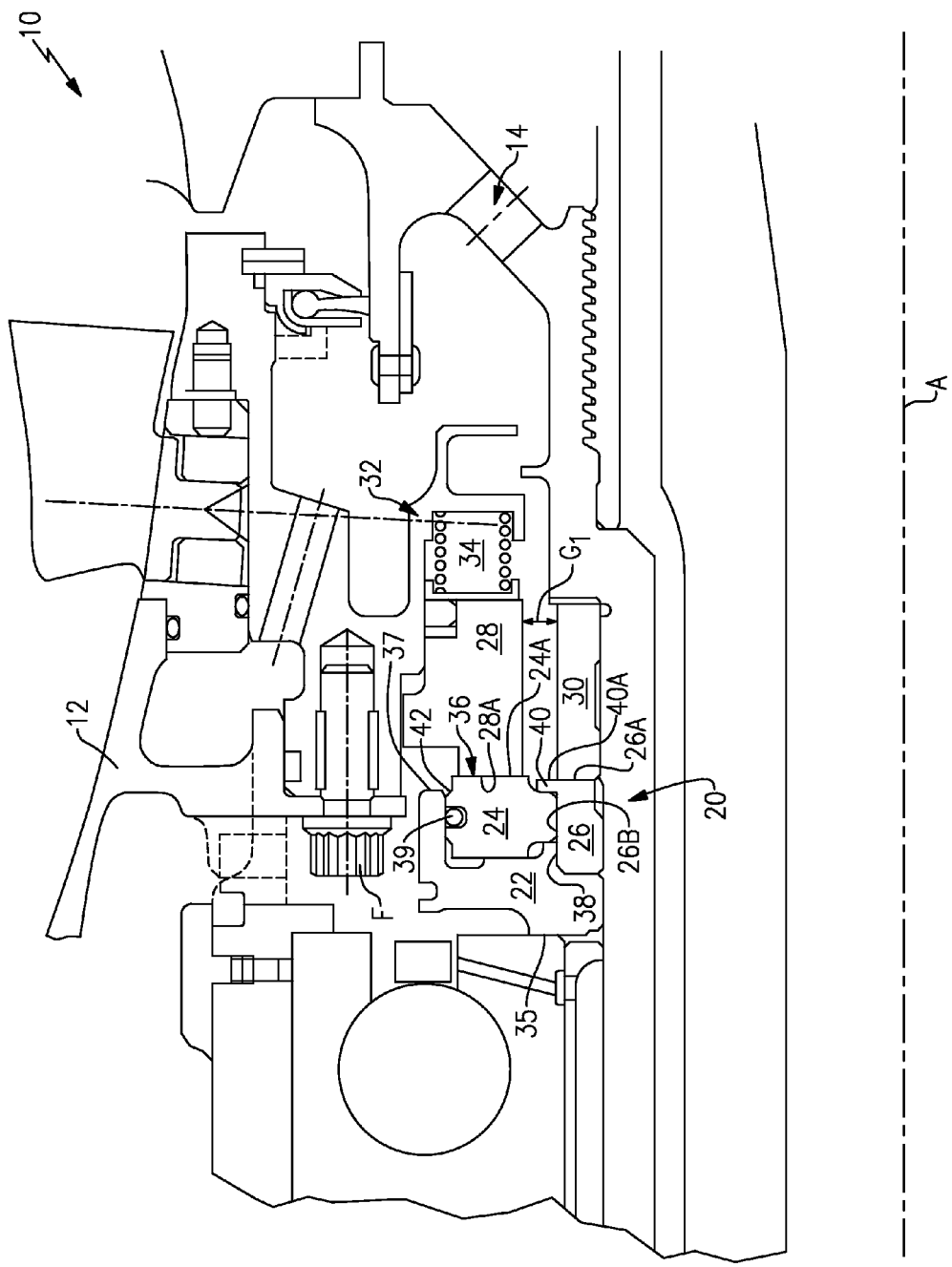
FIG. 1 is a cross-sectional view of a liftoff carbon seal assembly mounted within a gas turbine engine.

FIG. 1 illustrates a general partial fragmentary schematic view of a gas turbine engine 10 such as a gas turbine engine for propulsion. While a two spool high bypass turbofan engine is schematically illustrated in the disclosed non-limiting embodiment, it should be understood that the disclosure is applicable to other gas turbine engine configurations, including, for example, gas turbines for power generation, turbojet engines, low bypass turbofan engines, turboshaft engines, etc.

Figure 2:
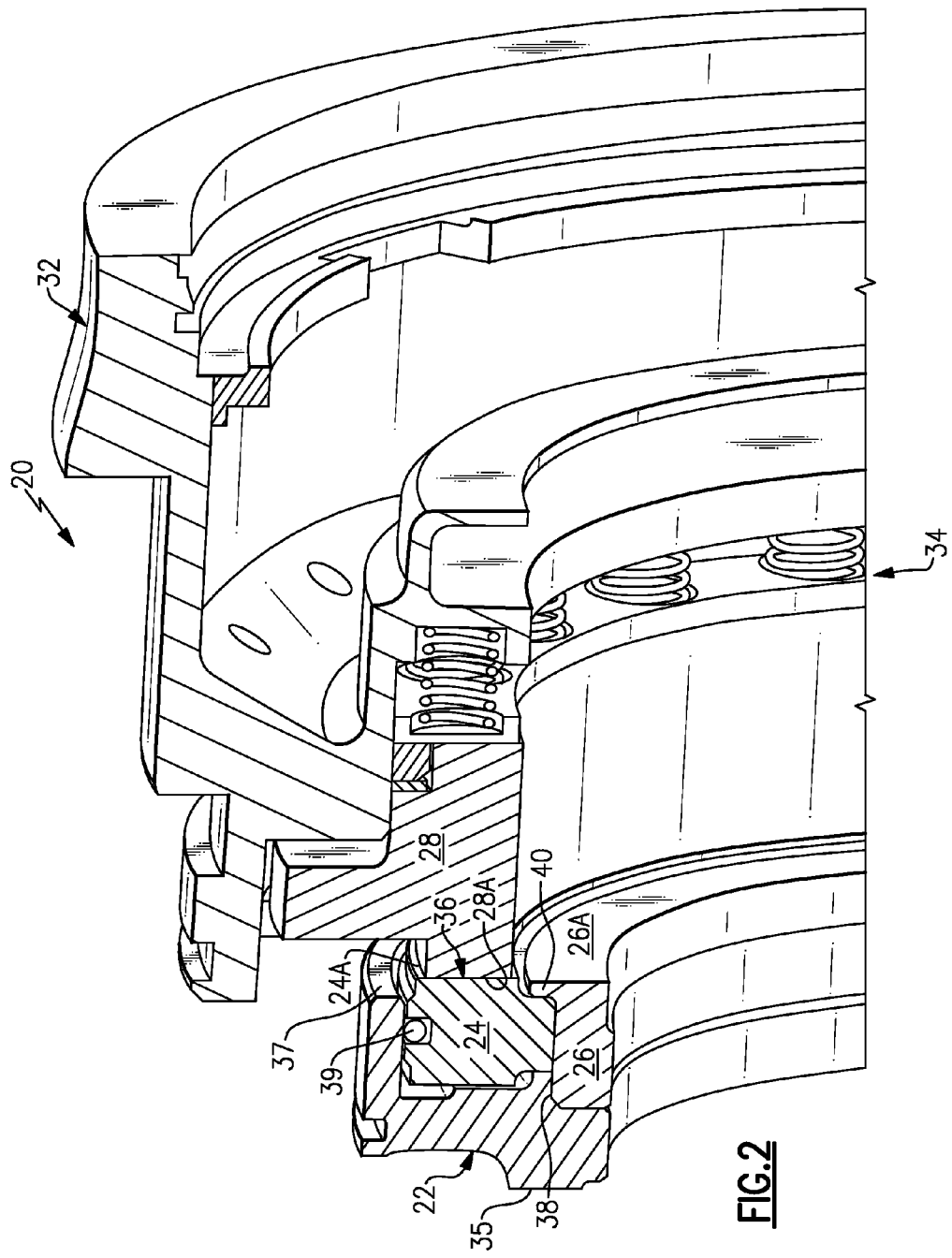
FIG. 2 is a perspective cross-sectional view of the liftoff carbon seal assembly at a radial location different than that of FIG. 1.

The engine 10 includes a liftoff carbon seal assembly 20 located between a static structure 12 such as an intermediate case and a rotational structure 14 such as a High Pressure Compressor shaft. The liftoff carbon seal assembly 20 generally includes a rotating seal backer plate 22, a rotating seal plate 24, a rotating seal plate retainer 26, a static carbon seal 28, a static seal support 32 and a spring assembly 34 (also illustrated separately in FIG. 2).

The static seal support 32 is mounted to the static structure 12 with a multiple of fasteners F (only one shown in FIG. 1). It should be understood that various mount arrangements may alternatively or additionally be provided about the diameter of the seal assembly 20 (see FIG. 2). The static seal support 32 retains the spring assembly 34 which axially biases the static carbon seal 28 toward the rotating seal plate 24 to form a stationary-rotational interface 36 between a seal plate face 24A and a static carbon seal face 28A. The stationary-rotational interface 36 utilizes an air cushion interface typical of a liftoff seal. That is, integral surfaces on either or both the seal plate face 24A and the static carbon seal face 28A generate lift in a conventional manner at the stationary-rotational interface 36.

The rotating seal backer plate 22, the rotating seal plate 24 and the rotating seal plate retainer 26 rotate in unison with the rotational structure 14. The rotating seal backer plate 22 and the rotating seal plate retainer 26 retain the rotating seal plate 24 therein on three-sides in one non-limiting embodiment. The rotating seal backer plate 22 interfaces with the rotating seal plate retainer 26 at a stepped interface 38. The rotating seal plate retainer 26 includes a lip 40 to at least partially retain the rotating seal plate 24 on a fourth side. One or more piston rings 39 or other such features may be mounted at least partially within and around the rotating seal plate 24 to further seal the rotating seal plate 24 in a radial direction with the rotating seal backer plate 22 and the rotating seal plate retainers 26.

The rotating seal plate 24 includes chamfered corners 42. The chamfered corners 42 may be of various forms such as a radius recess to clear the lip 40 and the stepped interface 38 as shown in FIG. 1. The chamfered corners 42 provides a cross-section of the rotating seal plate 24 that facilitate the extension of the rotating seal plate face 24A beyond a lip face 40A defined by the lip 40 and the aft end face 35 of the rotating seal backer plate 22. That is, the rotating seal plate face 24A extends axially beyond a rotating seal plate retainer face 26A of the rotating seal plate retainer 26.

The lip face 40A is essentially an outwardly directed radial extension of the seal plate retainer face 26A as the lip 40 extends in an outward radial direction from a support surface 26B of the rotating seal plate retainer 26. The support surface 26B extends parallel to an engine axis of rotation A to at least partially support the rotating seal plate 24.

The seal plate retainer face 26A may abut a sleeve 30. The static carbon seal 28 is radially outboard of the sleeve 30 and positioned adjacent to the rotating seal plate 24. Alternatively, the sleeve 30 may be formed as an integral extension of the rotating seal plate retainer 26.

Figure 3:
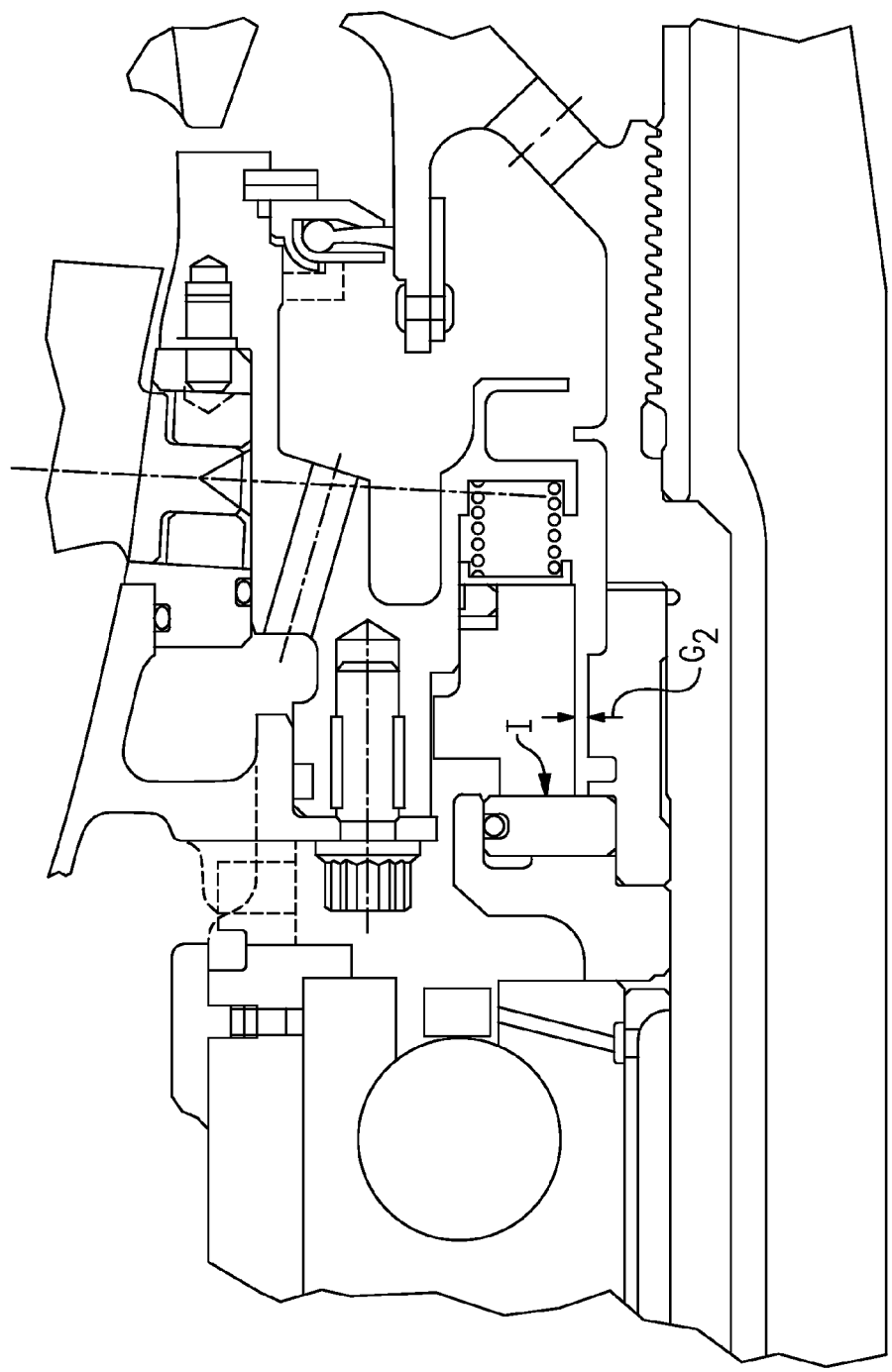
FIG. 3 is a cross-sectional view of a RELATED ART liftoff carbon seal assembly.

The cross-section of the rotating seal plate 24 is tailored in an axially direction to permit an increase in the adjacent static carbon seal face 28A with a resultant minimization of gap G1. The cross-section of the rotating seal plate 24 axially displaces the rotating seal plate face 24A outboard of the lip face 40A as compared to a conventional stationary-rotational interface I which does not extend axially beyond the rotating seal plate retainer (RELATED ART; FIG. 3). The axial offset of the stationary-rotating interface 36 also facilitates an inboard thickness increase of the static carbon seal 28 without a decrease in the static carbon seal 28 cross-section which provides a reduced gap G1 as compared to conventional gap G2 (RELATED ART; FIG. 3). The inboard thickness increase of the static carbon seal 28 provides a rigidity increase which thereby reduces the distortion potential of the static carbon seal 28 from thermal and pressure effects and maximizes stability in response to tolerances and/or deflections to minimize coning and distortions.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A liftoff carbon seal assembly comprising:
   a rotating seal backer plate rotatable about an axis;
   a rotating seal plate retainer adjacent to said rotating seal backer plate, said rotating seal plate retainer including a lip extending radially away from said axis;
   a rotating seal plate having a first seal plate end face and a second seal plate end face, said first seal plate end face facing said rotating seal backer plate, and wherein a first portion of said second seal plate end face extends axially beyond a rotating seal plate retainer face of said rotating seal plate retainer in a direction along said axis, and wherein said lip engages a second portion of said second seal plate end face, said first portion extending axially beyond said second portion;
   wherein said seal backer plate includes an axially extending portion of a stepped interface that extends into a chamfered corner recess of said rotating seal plate such that said axially extending stepped interface is radially between said rotating seal plate and said seal plate retainer; and
   a static carbon seal adjacent to said rotating seal plate.

2. The assembly as recited in claim 1, wherein said static carbon seal is spring biased toward said rotating seal plate.

3. The assembly as recited in claim 1, wherein said static carbon seal is spring biased relative to a static seal support.

4. The assembly as recited in claim 1, wherein said lip is defined at said rotating seal plate retainer face.

5. The assembly as recited in claim 4, further comprising a sleeve which abuts said rotating seal plate retainer face.

6. The assembly as recited in claim 4, wherein said rotating seal plate defines a chamfered corner adjacent to said lip.

7. The assembly as recited in claim 1, wherein said rotating seal plate is radially outboard of said rotating seal plate retainer relative to said axis.

8. The assembly as recited in claim 1, wherein said static carbon seal is symmetrical in cross-section.

9. A liftoff carbon seal assembly comprising:
   a rotating seal backer plate rotatable about an axis;
   a rotating seal plate retainer adjacent to said rotating seal backer plate, said rotating seal plate retainer face defines a lip extending radially away from said axis;
   a rotating seal plate having a first seal plate end face and a second seal plate end face, said first seal plate end face facing said rotating seal backer plate, and wherein a first portion of said second seal plate end face extends axially beyond said lip in a direction along said axis, and wherein said lip engages a second portion of said second seal plate end face, said first portion extending axially beyond said second portion;
   wherein said seal backer plate includes an axially extending portion of a stepped interface that extends into a chamfered corner recess of said rotating seal plate such that said axially extending stepped interface is radially between said rotating seal plate and said seal plate retainer; and
   a static carbon seal adjacent to said rotating seal plate.

10. The assembly as recited in claim 9, wherein said static carbon seal defines a parallel interface with said rotating seal plate.

11. The assembly as recited in claim 9, wherein said static carbon seal is spring biased toward said rotating seal plate.

12. The assembly as recited in claim 9, wherein said static carbon seal is symmetrical in cross-section.

13. The assembly as recited in claim 9, wherein said lip extends in a radially outward direction relative to said axis to be received within a chamfered corner recess of said rotating seal plate.

14. The assembly as recited in claim 13, wherein said lip defines a seal plate retainer face and wherein said rotating seal plate face extends axially beyond said seal plate retainer face.

15. The assembly as recited in claim 9, wherein said lip extends in a radially outward direction relative to said axis and defines a seal plate retainer face, and wherein said first portion of said second seal plate end face extends axially beyond said seal plate retainer face.

16. The assembly as recited in claim 15, wherein said second portion of said second seal plate end face extends axially aft of a seal backer plate end face in a direction along said axis.

17. The assembly as recited in claim 1, wherein said lip extends in a radially outward direction relative to said axis to be received within a chamfered corner recess of said rotating seal plate.

18. The assembly as recited in claim 17, wherein said lip defines said rotating seal plate retainer face.

19. The assembly as recited in claim 1, wherein said lip extends in a radially outward direction relative to said axis to define said rotating seal plate retainer face.

20. The assembly as recited in claim 13, wherein said lip does not extend radially beyond said recess.

21. The assembly as recited in claim 17, wherein said lip does not extend radially beyond said recess.

22. The assembly as recited in claim 1, including a spring axially spaced apart from said seal plate retainer and reacting between said static carbon seal and a static seal plate support.

23. The assembly as recited in claim 9, including a spring axially spaced apart from said seal plate retainer and reacting between said static carbon seal and a static seal plate support.

24. The assembly as recited in claim 1, wherein said seal backer plate surrounds at least three sides of said rotating seal plate.

25. The assembly as recited in claim 9, wherein said seal backer plate surrounds at least three sides of said rotating seal plate.

* * * * *